United States Patent
Watabe et al.

(10) Patent No.: US 10,354,801 B2
(45) Date of Patent: Jul. 16, 2019

(54) MULTI-LAYER CERAMIC ELECTRONIC COMPONENT

(71) Applicant: Taiyo Yuden Co., Ltd., Tokyo (JP)

(72) Inventors: Masataka Watabe, Tokyo (JP); Yasutomo Suga, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 15/881,360

(22) Filed: Jan. 26, 2018

(65) Prior Publication Data

US 2018/0218839 A1    Aug. 2, 2018

(30) Foreign Application Priority Data

Jan. 27, 2017   (JP) .................................. 2017-012889

(51) Int. Cl.
| | |
|---|---|
| *H01G 4/12* | (2006.01) |
| *H01G 4/248* | (2006.01) |
| *H01G 4/232* | (2006.01) |
| *H01G 4/30* | (2006.01) |
| *H01G 4/012* | (2006.01) |

(52) U.S. Cl.
CPC .............. *H01G 4/248* (2013.01); *H01G 4/12* (2013.01); *H01G 4/232* (2013.01); *H01G 4/30* (2013.01); *H01G 4/012* (2013.01); *H01G 4/1218* (2013.01); *H01G 4/1227* (2013.01); *H01G 4/1236* (2013.01); *H01G 4/1245* (2013.01)

(58) Field of Classification Search
CPC .......... H01G 4/006; H01G 4/05; H01G 4/012; H01G 4/12; H01G 4/30; H01G 4/1217; H01G 4/248
See application file for complete search history.

(56) References Cited

U.S. PATENT DOCUMENTS

| | | | |
|---|---|---|---|
| 2015/0016018 A1* | 1/2015 | Onishi ................... | H01G 4/005 361/301.4 |
| 2015/0185189 A1 | 7/2015 | Zhang et al. | |
| 2015/0318112 A1* | 11/2015 | Kwag ..................... | H01C 7/10 174/260 |

(Continued)

FOREIGN PATENT DOCUMENTS

JP          2014-130999 A       7/2014

*Primary Examiner* — Nguyen T Ha
(74) *Attorney, Agent, or Firm* — Saliwanchik, Lloyd & Eisenschenk

(57) ABSTRACT

A multi-layer ceramic electronic component includes: a ceramic body including first and second main surfaces oriented in a first axial direction, first and second end surfaces oriented in a second axial direction orthogonal to the first axial direction, a first internal electrode, and a second internal electrode, the ceramic body being formed to be long in a third axial direction orthogonal to the first and second axial directions; a first external electrode including a first cover portion and a first extension portion; and a second external electrode including a second cover portion and a second extension portion, the multi-layer ceramic electronic component satisfying that, when $T_1$ represents a dimension of the ceramic body in the first axial direction, and when $T_2$ represents a dimension of each of the first and second extension portions in the first axial direction, $T_1$ is 80 μm or less and $T_2/(T_1+T_2)$ is 0.32 or less.

4 Claims, 5 Drawing Sheets

(56) References Cited

U.S. PATENT DOCUMENTS

2015/0364261 A1* 12/2015 Takahashi ............... H01G 4/06
                                                                           361/301.4
2015/0380161 A1* 12/2015 Lim ......................... H01G 4/30
                                                                           361/301.4

\* cited by examiner

MULTI-LAYER CERAMIC ELECTRONIC COMPONENT

CROSS-REFERENCE TO RELATED APPLICATION

This application claims the benefit under 35 U.S.C. § 119 of Japanese Patent Application No. 2017-012889, filed Jan. 27, 2017, the disclosure of which is herein incorporated by reference in its entirety.

BACKGROUND

The present invention relates to a low-profile multi-layer ceramic electronic component.

Along with miniaturization of electronic devices, there are demands for reduction in height of multi-layer ceramic electronic components. Japanese Patent Application Laid-open No. 2014-130999 (hereinafter, referred to as Patent Document 1) discloses a low-profile multi-layer ceramic capacitor. In this multi-layer ceramic capacitor, external electrodes are made thinner, and a ceramic body is made thicker accordingly, thus ensuring strength in a thickness direction.

SUMMARY

However, in a super-thin multi-layer ceramic capacitor in which a ceramic body has a thickness of 80 μm or less, the strength in the thickness direction may be difficult to ensure only by the ceramic body. In other words, in such a multi-layer ceramic capacitor, sufficient strength is difficult to obtain even when the technique of Patent Document 1 is employed.

In view of the circumstances as described above, it is desirable to provide a low-profile multi-layer ceramic electronic component capable of ensuring flexural strength in a longitudinal direction.

According to an embodiment of the present invention, there is provided a multi-layer ceramic electronic component including a ceramic body, a first external electrode, and a second external electrode.

The ceramic body includes a first main surface and a second main surface that are oriented in a first axial direction, a first end surface and a second end surface that are oriented in a second axial direction orthogonal to the first axial direction, a first internal electrode that is drawn to the first end surface, and a second internal electrode that faces the first internal electrode and is drawn to the second end surface, the ceramic body being formed to be long in a third axial direction orthogonal to the first axial direction and the second axial direction.

The first external electrode includes a first cover portion that covers the first end surface, and a first extension portion that extends from the first cover portion to the second main surface.

The second external electrode includes a second cover portion that covers the second end surface, and a second extension portion that extends from the second cover portion to the second main surface.

The multi-layer ceramic electronic component satisfies that, when $T_1$ represents a dimension of the ceramic body in the first axial direction, and when $T_2$ represents a dimension of each of the first extension portion and the second extension portion in the first axial direction, $T_1$ is 80 μm or less and $T_2/(T_1+T_2)$ is 0.32 or less.

In the multi-layer ceramic electronic component, the first external electrode and the second external electrode are provided along the longitudinal direction of the ceramic body, and the ceramic body is reinforced by the first external electrode and the second external electrode. In this configuration, the ratio of the thickness $T_2$ of each of the first and second extension portions to the thickness $(T_1+T_2)$ of the multi-layer ceramic electronic component is set to 0.32 or less. Thus, high flexural strength in the longitudinal direction can be obtained as a whole of the ceramic body and the first and second external electrodes.

In the multi-layer ceramic electronic component, $T_2/(T_1+T_2)$ may be 0.04 or more.

In the multi-layer ceramic electronic component, $T_2$ may be 3 μm or more.

In this configuration, an effect of reinforcing the ceramic body by the first external electrode and the second external electrode can be more effectively obtained.

It is possible to provide a low-profile multi-layer ceramic electronic component capable of ensuring flexural strength in a longitudinal direction.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Configuration Of Multi-layer Ceramic Capacitor 10

Figure 1:
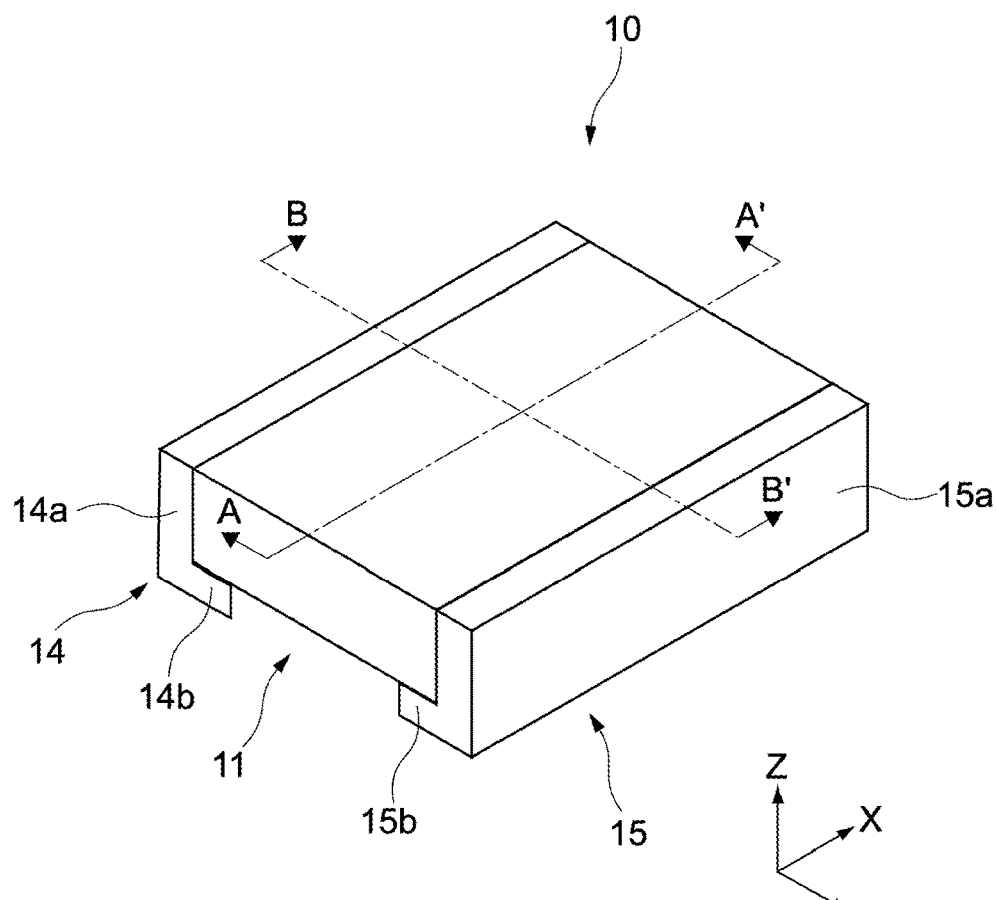
FIG. 1 is a perspective view of a multi-layer ceramic capacitor according to an embodiment of the present invention.
Figure 2:
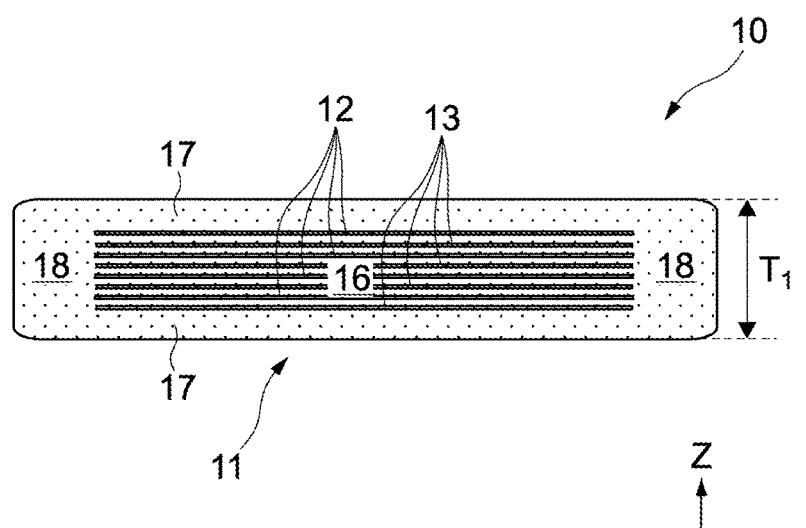
FIG. 2 is a cross-sectional view of the multi-layer ceramic capacitor taken along the A-A' line in FIG. 1.
Figure 3:
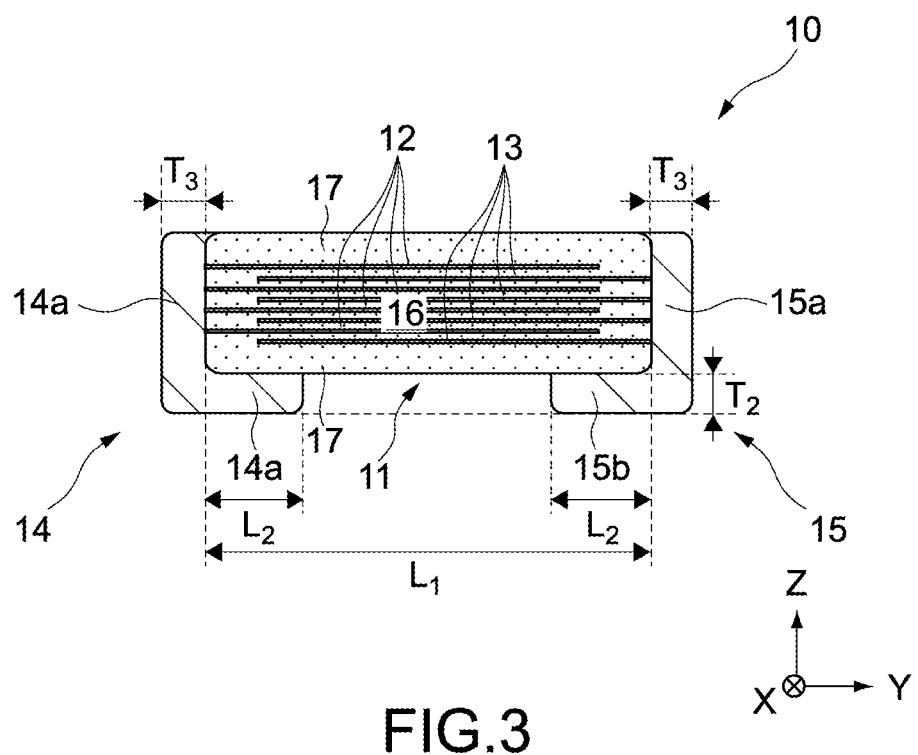
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is formed to have a low profile. For example, the thickness (dimension in a Z-axis direction) of the multi-layer ceramic capacitor 10 can be set to 100 μm or less. Further, in the multi-layer ceramic capacitor 10, for example, a dimension in a longitudinal direction (X-axis direction) can be set in the range of 0.5 mm to 2.0 mm, and a dimension in a lateral direction (Y-axis direction) can be set in the range of 0.2 mm to 1.0 mm.

More specifically, the size of the multi-layer ceramic capacitor 10 can be set to, for example, 0.6 mm by 0.3 mm by 50 µm, 1.0 mm by 0.5 mm by 80 µm, or 1.6 mm by 0.8 mm by 100 µm. As a matter of course, the multi-layer ceramic capacitor 10 can have various sizes other than the sizes describe above.

The multi-layer ceramic capacitor 10 includes a ceramic body 11, a first external electrode 14, and a second external electrode 15. The ceramic body 11 is formed as a main body of the multi-layer ceramic capacitor 10 and formed to be long in the X-axis direction. Each of the first external electrode 14 and the second external electrode 15 partially covers the surface of the ceramic body 11.

The ceramic body 11 has a hexahedral shape having two side surfaces oriented in the X-axis direction, two end surfaces oriented in the Y-axis direction, and two main surfaces oriented in the Z-axis direction. It should be noted that the ceramic body 11 may not have the hexahedral shape in a precise sense. For example, the surfaces of the ceramic body 11 may be curved surfaces, and the ceramic body 11 may be rounded as a whole.

A thickness $T_1$, which is the dimension of the ceramic body 11 in the Z-axis direction, is 80 µm or less. In this manner, the thickness $T_1$ of the ceramic body 11 is made very small, and thus the thickness of the multi-layer ceramic capacitor 10, which includes the thicknesses of the first external electrode 14 and the second external electrode 15, can be set to 100 µm or less.

Meanwhile, when the thickness $T_1$ of the ceramic body 11 is made very small, a ratio (aspect ratio) of the dimension in the longitudinal direction to the thickness $T_1$ in the ceramic body 11 is increased. This reduces flexural strength in the longitudinal direction in the ceramic body 11, and mechanical damage such as a crack becomes prone to occur due to stress in the thickness direction that is applied to the center portion of the ceramic body 11 in the longitudinal direction.

In the ceramic body 11, when the thickness $T_1$ is equal to or smaller than one-fifth of the dimension in the longitudinal direction, mechanical damage is particularly prone to occur. Although it is assumed that the stress in the thickness direction is applied to the ceramic body 11 at various timings, in particular, there is a demand to withstand the stress in the thickness direction that is applied at the time of mounting of the multi-layer ceramic capacitor 10.

In other words, the multi-layer ceramic capacitor 10 is mounted to a substrate by use of a chip mounter that holds the center portion of one of the main surfaces of the ceramic body 11 by suction. At that time, the stress in the thickness direction is applied from the chip mounter to the main surface of the ceramic body 11. With the single ceramic body 11, flexural strength to withstand the stress described above may be difficult to obtain.

In this embodiment, the first external electrode 14 and the second external electrode 15 are provided over the entire range of the ceramic body 11 in the longitudinal direction and has a function of reinforcing the ceramic body 11 along the longitudinal direction. The first external electrode 14 includes a first cover portion 14a that covers one of the end surfaces of the ceramic body 11, and the second external electrode 15 includes a second cover portion 15a that covers the other end surface of the ceramic body 11.

The first external electrode 14 includes a first extension portion 14b that extends along the Y-axis direction from the first cover portion 14a to the main surface on the lower side in the Z-axis direction. The second external electrode 15 includes a second extension portion 15b that extends along the Y-axis direction from the second cover portion 15a to the main surface on the lower side in the Z-axis direction. The first extension portion 14b and the second extension portion 15b are separated from each other in the Y-axis direction.

Meanwhile, the first external electrode 14 does not extend to the main surface of the ceramic body 11 on the upper side in the Z-axis direction. Further, the second external electrode 15 does not also extend to the main surface of the ceramic body 11 on the upper side in the Z-axis direction. With those configurations, each of the first external electrode 14 and the second external electrode 15 has an L-shaped cross section parallel to a Y-Z plane.

In other words, both ends of the ceramic body 11 in the lateral direction are covered with the first external electrode 14 and the second external electrode 15 each having the L-shaped cross section. With this configuration, the ceramic body 11 is reinforced by the first external electrode 14 and the second external electrode 15 along the longitudinal direction. As a result, in the multi-layer ceramic capacitor 10, flexural strength can be ensured as a whole of the ceramic body 11 and the first and second external electrodes 14 and 15.

The thickness that is the dimension of the multi-layer ceramic capacitor 10 in the Z-axis direction can be expressed as a sum $(T_1+T_2)$ of the thickness $T_1$ of the ceramic body 11 and a thickness $T_2$ that is a dimension of each of the first and second extension portions 14b and 15b in the Z-axis direction. In other words, in the multi-layer ceramic capacitor 10, a ratio of the thicknesses $T_1$ and $T_2$ can be determined such that an expected thickness $(T_1+T_2)$ is obtained.

In the multi-layer ceramic capacitor 10, the presence of the first extension portion 14b and the second extension portion 15b of the first external electrode 14 and the second external electrode 15 mainly leads to an effect of reinforcing the ceramic body 11 along the longitudinal direction. Therefore, if the thickness $T_2$ of each of the first and second extension portions 14b and 15b is larger than zero, the flexural strength of the multi-layer ceramic capacitor 10 can be improved.

However, in order to more effectively obtain the effect of reinforcing the ceramic body 11 by the first extension portion 14b and the second extension portion 15b, it is desirable that the thickness $T_2$ of each of the first and second extension portions 14b and 15b is ensured to some extent. Specifically, in the multi-layer ceramic capacitor 10, $T_2/(T_1+T_2)$ is desirably 0.04 or more.

Further, from a similar perspective, in the multi-layer ceramic capacitor 10, the thickness $T_2$ of each of the first and second extension portions 14b and 15b is desirably 3 µm or more, and more desirably, 5 µm or more. Further, in this case, an effect capable of inhibiting solder erosion in the first extension portion 14b and the second extension portion 15b is also obtained at the time of mounting of the multi-layer ceramic capacitor 10.

Meanwhile, when the ratio of the thickness $T_2$ of each of the first and second extension portions 14b and 15b to the thickness $(T_1+T_2)$ of the multi-layer ceramic capacitor 10 is extremely increased, the thickness $T_1$ of the ceramic body 11 becomes extremely small, and the flexural strength of the single ceramic body 11 becomes insufficient. Therefore, the thickness $T_1$ of the ceramic body 11 is necessary to be ensured to some extent.

Specifically, in the multi-layer ceramic capacitor 10, the ratio of the thicknesses $T_1$ and $T_2$ is determined such that $T_2/(T_1+T_2)$ is 0.32 or less. Further, in the multi-layer ceramic capacitor 10, $T_2/(T_1+T_2)$ is desirably 0.3 or less. With this configuration, flexural strength of the multi-layer ceramic capacitor 10 in the longitudinal direction is improved.

In other words, in the multi-layer ceramic capacitor 10, when the ratio of the thicknesses $T_1$ and $T_2$ is set as described above, higher flexural strength is likely to be obtained than in a configuration in which the first extension portion 14b and the second extension portion 15b are not provided to the first external electrode 14 and the second external electrode 15, respectively, i.e., a configuration in which the thickness $T_2$ is zero. Therefore, an effect produced by providing the first extension portion 14b and the second extension portion 15b to the first external electrode 14 and the second external electrode 15, respectively, can be effectively obtained.

It should be noted that the thickness $T_2$ of each of the first and second extension portions 14b and 15b may not be made uniform. In this case, the thickness $T_2$ of each of the first and second extension portions 14b and 15b can be defined as the maximum value of the thickness of each of the first and second extension portions 14b and 15b. Further, a thickness $T_3$, which is the dimension of each of the first cover portion 14a and the second cover portion 15a of the first external electrode 14 and the second external electrode 15, respectively, in the Y-axis direction may be nearly equal to or different from the thickness $T_2$ of each of the first and second extension portions 14b and 15b.

Further, in the first extension portion 14b and the second extension portion 15b, in order to favorably obtain the function of reinforcing the main surface of the ceramic body 11, it is desirable that a dimension $L_2$ in the Y-axis direction is set to be equal to or larger than 25% of a dimension $L_1$ of the ceramic body 11 in the lateral direction. Further, from a similar perspective, it is desirable that the dimension $L_2$ of each of the first and second extension portions 14b and 15b is set to 125 μm or more.

The first external electrode 14 and the second external electrode 15 are each formed of a good conductor of electricity and function as terminals of the multi-layer ceramic capacitor 10. Examples of the good conductor of electricity forming the first external electrode 14 and the second external electrode 15 include a metal mainly containing nickel (Ni), copper (Cu), palladium (Pd), platinum (Pt), silver (Ag), gold (Au), or the like, and an alloy of those metals.

The first external electrode 14 and the second external electrode 15 are not limited to a specific configuration. For example, the first external electrode 14 and the second external electrode 15 may have a single-layer structure or multi-layer structure. The first and second external electrodes 14 and 15 of the multi-layer structure may be formed to have a double-layer structure including a base film and a surface film, or a three-layer structure including a base film, an intermediate film, and a surface film, for example.

The base film can mainly contain nickel (Ni), copper (Cu), palladium (Pd), platinum (Pt), silver (Ag), or gold (Au), for example. In this embodiment, the base film is formed by sputtering. However, the base film can also be formed by, for example, dipping, spraying, or printing other than sputtering.

The intermediate film can mainly contain platinum (Pt), palladium (Pd), gold (Au), copper (Cu), or nickel (Ni), for example. The surface film can mainly contain copper (Cu), tin (Sn), palladium (Pd), gold (Au), or zinc (Zn), for example. The intermediate film and the surface film can be formed by plating, for example.

The ceramic body 11 includes a capacitance forming unit 16, covers 17, and side margins 18. The capacitance forming unit 16 is disposed at the center portion of the ceramic body 11 in the X- and Z-axis directions. The covers 17 cover the capacitance forming unit 16 from the Z-axis direction, and the side margins 18 cover the capacitance forming unit 16 from the X-axis direction.

More specifically, the covers 17 are disposed on both sides of the capacitance forming unit 16 in the Z-axis direction. The side margins 18 are disposed on both sides of the capacitance forming unit 16 in the X-axis direction. The covers 17 and the side margins 18 have main functions of protecting the capacitance forming unit 16 and ensuring insulation properties of the periphery of the capacitance forming unit 16.

The capacitance forming unit 16 includes a plurality of first internal electrodes 12 and a plurality of second internal electrodes 13. The first internal electrodes 12 and the second internal electrodes 13 each have a sheet-like shape extending along an X-Y plane and are alternately disposed along the Z-axis direction. The first internal electrodes 12 and the second internal electrodes 13 face each other in the Z-axis direction in the capacitance forming unit 16.

Figure 4:
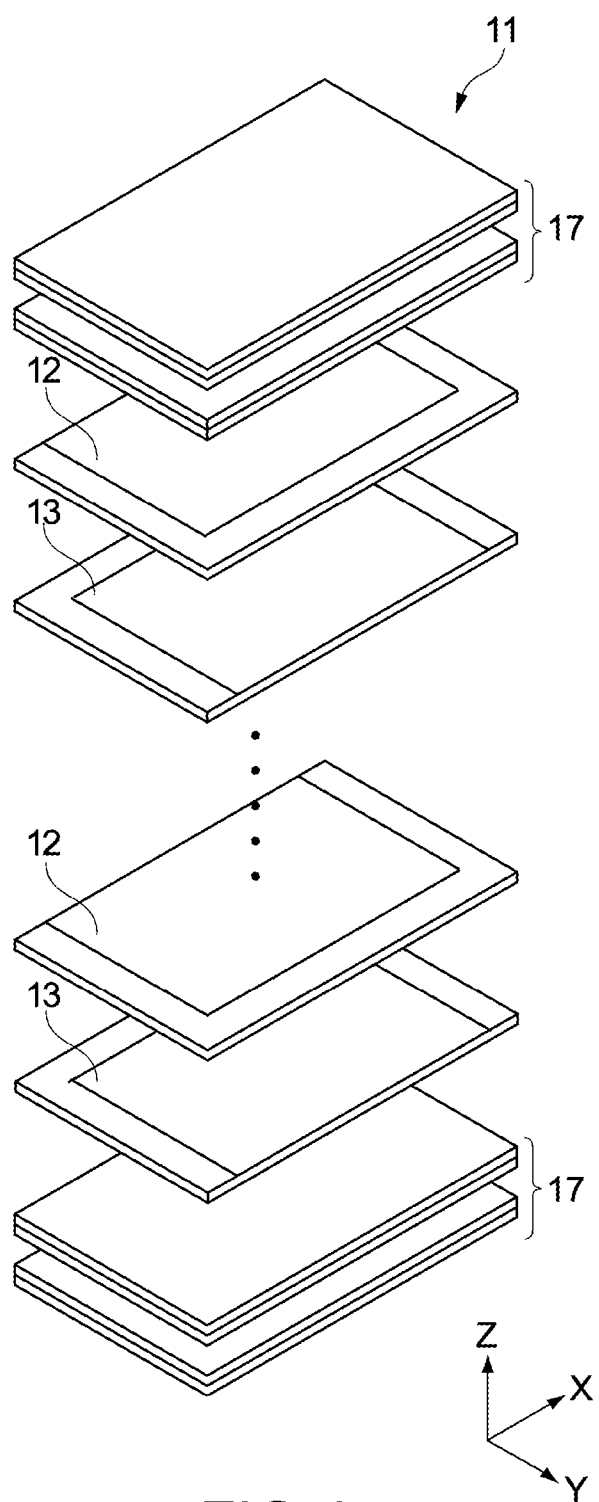
FIG. 4 is an exploded perspective view of a ceramic body of the multi-layer ceramic capacitor.

FIG. 4 is an exploded perspective view of the ceramic body 11. The ceramic body 11 has a structure in which sheets are laminated as shown in FIG. 4. The capacitance forming unit 16 and the side margins 18 can be formed of sheets on which the first internal electrodes 12 and the second internal electrodes 13 are printed. The covers 17 can be formed of sheets on which the first internal electrodes 12 and the second internal electrodes 13 are not printed.

As shown in FIG. 3, the first internal electrodes 12 are drawn to the end surface of the ceramic body 11 on the first external electrode 14 side and are connected to the first external electrode 14. The second internal electrodes 13 are drawn to the end surface of the ceramic body 11 on the second external electrode 15 side and are connected to the second external electrode 15. With this configuration, the first internal electrodes 12 and the second internal electrodes 13 are electrically continuous with the first external electrode 14 and the second external electrode 15, respectively.

Further, the first internal electrodes 12 are disposed with a gap between the first internal electrodes 12 and the second external electrode 15, and are insulated from the second external electrode 15. The second internal electrodes 13 are disposed with a gap between the second internal electrodes 13 and the first external electrode 14, and are insulated from the first external electrode 14. In other words, the first internal electrodes 12 are electrically continuous with only the first external electrode 14, and the second internal electrodes 13 are electrically continuous with only the second external electrode 15.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

The capacitance forming unit 16 is formed of dielectric ceramics. In the multi-layer ceramic capacitor 10, in order to increase capacitances of respective dielectric ceramic layers provided between the first internal electrodes 12 and the second internal electrodes 13, dielectric ceramics having a high dielectric constant is used as a material forming the capacitance forming unit 16. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the capacitance forming unit 16 may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The covers 17 and the side margins 18 are also formed of dielectric ceramics. A material forming the covers 17 and the side margins 18 may be insulating ceramics, but if a material having a composition system similar to that of the capacitance forming unit 16 is used therefor, production efficiency is increased, and internal stress in the ceramic body 11 is suppressed.

With the configuration described above, when a voltage is applied between the first external electrode 14 and the second external electrode 15 in the multi-layer ceramic capacitor 10, the voltage is applied to the dielectric ceramic layers between the first internal electrodes 12 and the second internal electrodes 13 in the capacitance forming unit 16. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be employed as appropriate depending on the size and performance expected for the multi-layer ceramic capacitor 10. For example, the number of first internal electrodes 12, the number of second internal electrodes 13, and the thickness of each of the dielectric ceramic layers between the first internal electrodes 12 and the second internal electrodes 13 can be determined as appropriate.

2. Action and Effect of Multi-layer Ceramic Capacitor 10

Figure 5:
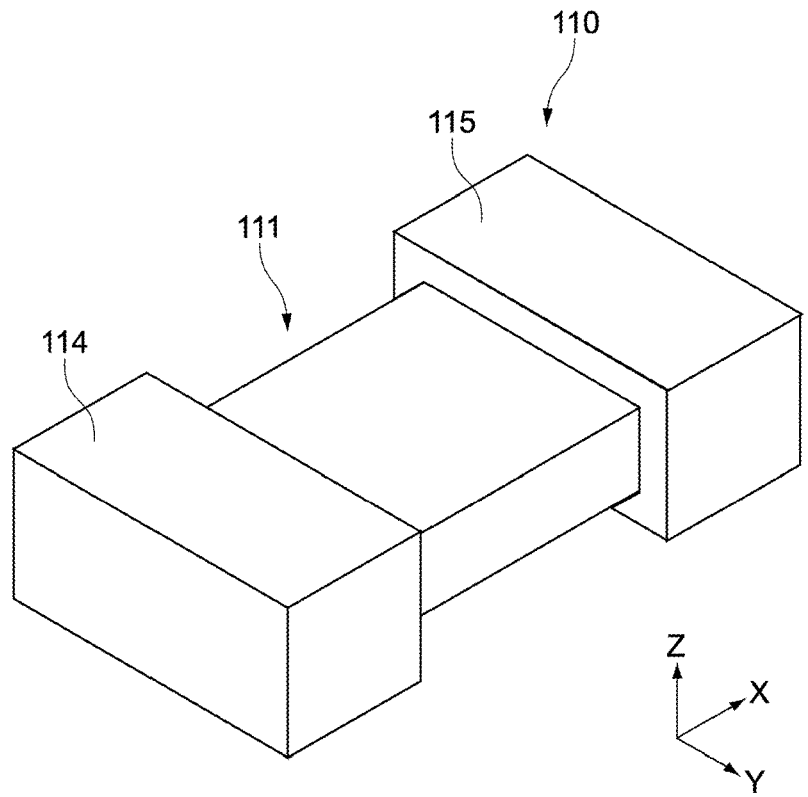
FIG. 5 is a perspective view of a multi-layer ceramic capacitor according to Comparative Example.

FIG. 5 is a perspective view of a multi-layer ceramic capacitor 110 according to Comparative Example. The multi-layer ceramic capacitor 110 is different from the multi-layer ceramic capacitor 10 according to this embodiment and has a general configuration in which external electrodes 114 and 115 are provided to both ends of a ceramic body 111 in the longitudinal direction (X-axis direction).

In the multi-layer ceramic capacitor 110 according to Comparative Example, the center portion in the longitudinal direction is constituted of only the ceramic body 111. Therefore, the flexural strength of the multi-layer ceramic capacitor 110 in the longitudinal direction is equal to that of the single ceramic body 111 in the longitudinal direction.

As a result, in the multi-layer ceramic capacitor 110, when a thickness $T_1$ of the ceramic body 111 is set to 80 μm or less, the flexural strength in the longitudinal direction becomes insufficient. Therefore, in the multi-layer ceramic capacitor 110, when stress in the thickness direction is applied to the center portion of the ceramic body 111 in the longitudinal direction at the time of mounting or the like, mechanical damage such as a crack is prone to occur.

Meanwhile, in the multi-layer ceramic capacitor 10 according to this embodiment, as described above, the ceramic body 11 is reinforced by the first external electrode 14 and the second external electrode 15 along the longitudinal direction. Therefore, higher flexural strength in the longitudinal direction is obtained in the multi-layer ceramic capacitor 10 than in the multi-layer ceramic capacitor 110 according to Comparative Example.

In other words, in the multi-layer ceramic capacitor 10 according to this embodiment, the first external electrode 14 and the second external electrode 15 are changed from the general configuration, and thus the flexural strength in the longitudinal direction can be improved. Therefore, in the multi-layer ceramic capacitor 10, mechanical damage can be inhibited without adding a new configuration.

Additionally, in the multi-layer ceramic capacitor 10 according to this embodiment, the first external electrode 14 and the second external electrode 15 are provided to both ends of the ceramic body 11 in the lateral direction, and thus the first external electrode 14 and the second external electrode 15 are close to each other. As a result, in the multi-layer ceramic capacitor 10, equivalent series inductance (ESL) can be reduced.

3. Example

For the multi-layer ceramic capacitor 10, six types of samples were produced, which were identical to one another in the thickness ($T_1+T_2$) of 67 μm and different from one another in the ratio $T_2/(T_1+T_2)$ of the thickness $T_2$ of each of the first and second extension portions 14b and 15b to the thickness ($T_1+T_2$). In each of the samples, the dimension in the X-axis direction was set to 1.0 mm, and the dimension in the Y-axis direction was set to 0.5 mm.

The ceramic body 11 of each sample was produced by sintering a chip, the chip being obtained by cutting a multi-layer of dielectric ceramic green sheets on which an electrical conductive paste for forming the internal electrodes is printed as appropriate. A sintering temperature for the ceramic body 11 was set to 1,000 to 1,400° C.

For the multi-layer ceramic capacitor 10, after consideration of the amount of shrinking at the time of sintering of the ceramic body 11, the number of laminated green sheets each having the thickness of 0.5 to 3 μm was adjusted, to produce six types of samples in which the ceramic body 11 has the thicknesses $T_1$ of 67 μm, 64 μm, 62 μm, 57 μm, 47 μm, and 37 μm.

The first external electrode 14 and the second external electrode 15 of each sample were formed by plating treatment performed on the base films deposited by sputtering. The thickness $T_2$ of each of the first extension portion 14b and the second extension portion 15b of the first external electrode 14 and the second external electrode 15 of each sample was set to 0 μm (in the absence of the first extension portion 14b and the second extension portion 15b), 3 μm, 5 μm, 10 μm, 20 μm, and 30 μm, through the adjustment of conditions for the plating treatment (current, time, and the like).

It should be noted that the five samples in which the thicknesses $T_2$ of each of the first and second extension portions 14b and 15b are 3 μm, 5 μm, 10 μm, 20 μm, and 30 μm correspond to Example of the embodiment described above. Meanwhile, the sample in which the first extension portion 14b and the second extension portion 15b are not provided, i.e., the sample in which the thickness $T_2$ of each of the first and second extension portions 14b and 15b is 0 μm, corresponds to Comparative Example of the embodiment described above.

Figure 6:
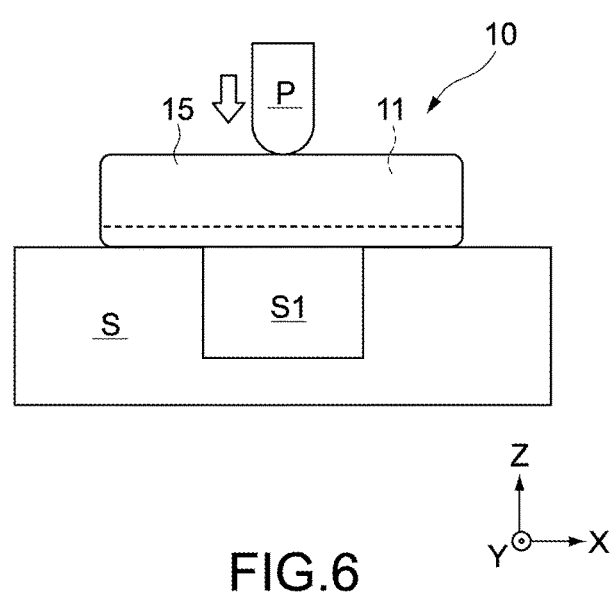
FIG. 6 is a schematic view for describing flexural strength measurement of multi-layer ceramic capacitors according to Example and Comparative Example.

The flexural strength was measured for the samples of the multi-layer ceramic capacitor 10 that were obtained as described above. FIG. 6 is a schematic view for describing the flexural strength measurement. In the flexural strength measurement, a base S and a pusher P are used. The base S includes a recess S1 that is recessed downward in the Z-axis direction. The pusher P is disposed above the recess S1 of the base S in the Z-axis direction.

A dimension of the recess S1 of the base S in the X-axis direction is 0.6 times as large as the dimension of each sample in the longitudinal direction. Further, the lower end of the pusher P in the Z-axis direction is formed to have an arc-shaped cross section with a radius of 500 μm. Each sample is set on the base S so as to cross over the recess S1 in the longitudinal direction and such that the pusher P faces the center portion of the main surface of the ceramic body 11.

FIG. 6 shows a state where the sample of the multi-layer ceramic capacitor 10 is set on the base S. From this state, the pusher P is moved downward in the Z-axis direction, and stress is applied downward in the Z-axis direction to the upper surface of each sample in the Z-axis direction until mechanical damage occurs in each sample. In this period, a load applied to each sample from the pusher P was sequentially measured.

Figure 7:
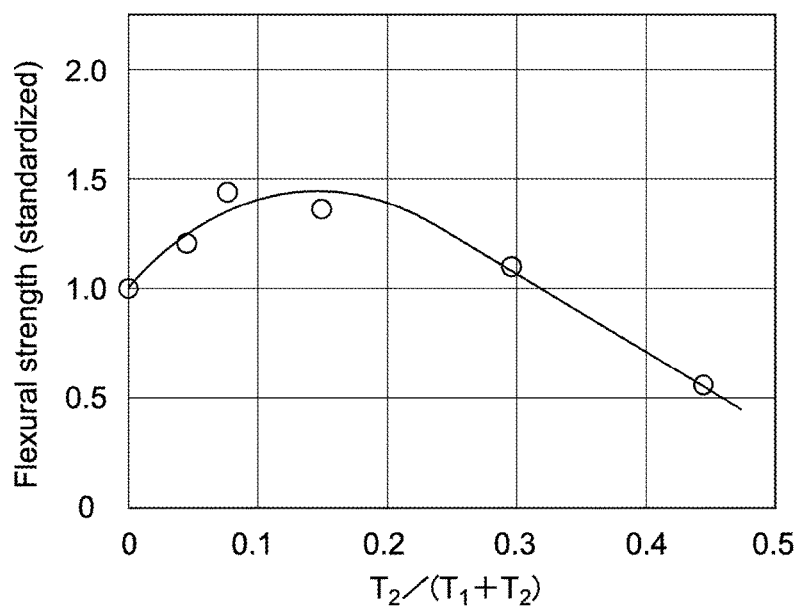
FIG. 7 is a graph showing results of the flexural strength measurement of the multi-layer ceramic capacitors according to Example and Comparative Example.

A load generated when mechanical damage occurs in each sample was assumed as flexural strength of each sample. FIG. 7 is a graph showing results of the flexural strength measurement of the samples. The horizontal axis of FIG. 7 represents the ratio $T_2/(T_1+T_2)$ of the thickness $T_2$ of each of the first and second extension portions 14b and 15b to the thickness $(T_1+T_2)$ in each sample, and the vertical axis of FIG. 7 represents the flexural strength of each sample.

It should be noted that the flexural strength shown in FIG. 7 is expressed by not a measured value of the load but a standardized value of the flexural strength of the samples according to Example, with "1" being set for the flexural strength of the sample according to Comparative Example where $T_2/(T_1+T_2)$ is zero (i.e., in the absence of the first extension portion 14b and the second extension portion 15b) in the multi-layer ceramic capacitor 10. In other words, the flexural strength shown in FIG. 7 is a relative value of the flexural strength of the respective samples.

As shown in FIG. 7, an approximate curve forming the shape of an arch can be drawn through the plotted points. More specifically, the flexural strength of the multi-layer ceramic capacitor 10 increases in a region where $T_2/(T_1+T_2)$ falls within the range from 0 to about 0.15, starts to decrease when $T_2/(T_1+T_2)$ exceeds around 0.15, and then linearly decreases in a region where $T_2/(T_1+T_2)$ exceeds 0.25.

Further, it is found that when $0<T_2/(T_1+T_2)\leq 0.32$, the flexural strength is larger than 1.0, that is, higher flexural strength is obtained than that of the sample without the first extension portion 14b and the second extension portion 15b. Further, it is found that when $0.04\leq T_2/(T_1+T_2)\leq 0.3$, the flexural strength is 1.1 or more, and flexural strength that is 10 percent or more as large as that of the sample without the first extension portion 14b and the second extension portion 15b is obtained.

4. Other Embodiments

While the embodiment of the present invention has been described, the present invention is not limited to the embodiment described above, and it should be appreciated that the present invention may be variously modified.

For example, in the multi-layer ceramic capacitor 10, the first external electrode 14 and the second external electrode 15 may be extended from the end surfaces of the ceramic body 11 to not only the main surface on the lower side in the Z-axis direction but also at least one of both the side surfaces oriented in the X-axis direction. In other words, the first external electrode 14 and the second external electrode 15 of the multi-layer ceramic capacitor 10 may have L-shaped or U-shaped cross sections along the X-Y plane.

Further, in the embodiment described above, the multi-layer ceramic capacitor 10 has been described as an example of a multi-layer ceramic electronic component, but the present invention can be applied to any other multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising:
   a ceramic body including
      a first main surface,
      a second main surface,
      a first side surface and a second side surface each connecting the first main surface to the second main surface in a first axial direction,
      a first end surface and a second end surface connected to each other by each of the first main surface and the second main surface in a second axial direction orthogonal to the first axial direction, the first end surface and the second end surface each connecting the first main surface to the second main surface in the first axial direction, and each connecting the first side surface to the second side surface in a third axial direction perpendicular to both the first axial direction and the second axial direction,
      a first internal electrode that is drawn to the first end surface, and
      a second internal electrode that faces the first internal electrode and is drawn to the second end surface,
      a length of the ceramic body measured in the third axial direction being longer than both a length of the ceramic body measured in the first axial direction and a length of the ceramic body measured in the second axial direction;
   a first external electrode including
      a first cover portion that covers the first end surface, and
      a first extension portion that extends from the first cover portion and covers a first portion of the second main surface; and
   a second external electrode including
      a second cover portion that covers the second end surface, and
      a second extension portion that extends from the second cover portion and covers a
   second portion of the second main surface,
   the multi-layer ceramic electronic component satisfying that, when $T_1$ represents the length of the ceramic body measured in the first axial direction, and when $T_2$ represents a length of each of the first extension portion and the second extension portion measured in the first axial direction, $T_1$ is 80 μm or less and $T_2/(T_1+T_2)$ is 0.32 or less.

2. The multi-layer ceramic electronic component according to claim 1, wherein $T_2/(T_1+T_2)$ is 0.04 or more.

3. The multi-layer ceramic electronic component according to claim 1, wherein $T_2$ is 3 μm or more.

4. The multi-layer ceramic electronic component according to claim 2, wherein $T_2$ is 3 μm or more.

* * * * *